United States Patent
Pesovic et al.

[11] Patent Number: 5,370,356
[45] Date of Patent: Dec. 6, 1994

[54] ONE-WAY FLUID FLOW NON-RETURN VALVE

[76] Inventors: Predrag L. J. Pesovic, Patrisa Lumumbe 24, 11000 Beograd, Yugoslavia; Nemanja P. Pesovic; Vojin P. Pesovic, both of 233 Alexander Hall, Raleigh, N.C. 27607

[21] Appl. No.: 81,278
[22] PCT Filed: Dec. 24, 1991
[86] PCT No.: PCT/US91/09199
§ 371 Date: Mar. 7, 1994
§ 102(e) Date: Mar. 7, 1994
[87] PCT Pub. No.: WO92/11480
PCT Pub. Date: Jul. 9, 1992

[30] Foreign Application Priority Data
Dec. 25, 1990 [YU] Yugoslavia .................... 2455/90
Nov. 21, 1991 [YU] Yugoslavia .................... 1830/91

[51] Int. Cl.⁵ ............................................ F16K 1/02
[52] U.S. Cl. .................................. 251/83; 251/252
[58] Field of Search .................. 251/82, 83, 252, 254, 251/255

[56] References Cited
U.S. PATENT DOCUMENTS
630,949  8/1899  Thummel ............... 251/83
858,771  7/1907  Whitehouse ........... 251/252
1,541,757 6/1925 Allen ..................... 251/83

Primary Examiner—Robert G. Nilson
Attorney, Agent, or Firm—Jacobson, Price, Holman & Stern

[57] ABSTRACT

The invention concerns a one-way fluid flow non-return valve, consisting of body (19) with shaft (2), onto which cover (15) with seal (16) is mounted. Into the blind hole (4) in shaft a helical spring (3) is inserted together with piston (1) in a sliding fit. Shaft (2), together with piston (1) is introduced into the central opening of bushing (9), having on its lower part a groove (10), into which wedge (5) engages. Bushing has two diametrically opposed cut-out grooves (13), while the valve body (19) carries a cover (15) with mutually rectangular molded grooves (18). A modified form of the invention includes telescoped external and internal envelopes to reduce the possibility of malfunction due to impurities in the liquid flowing through the valve.

12 Claims, 1 Drawing Sheet

ONE-WAY FLUID FLOW NON-RETURN VALVE

BACKGROUND OF THE INVENTION

1. Field of the Invention

The present invention relates to a one-way fluid flow, non-return valve and is classified, by International Patent Classification F 16 K 1/02.

2. Description of Related Art

The instant invention is specifically designed to provide a valve for use in sanitary water systems with the valve functioning to prevent the return of fluid back into the water system in case of pressure lost, even when the valve has been left in the open position.

Although various forms of valves of this type heretofore have been provided, one problem existing with previously known valves is that in the event the valve handles water having dirt or other impurities therein it is possible that dirt within the water passing through the valve may accumulate in internal areas of the valve and prevent proper non-return flow of water therethrough.

Previously known non-return flow valves are used not only in domestic water systems but also in other fluid systems and usually operate on the principle of a threaded shaft, whereby movement of a valve operation piston is effected by rotation of the threaded shaft or a shaft equipped with a helical groove. Each of these forms of valves usually does not protect the fluid system from return flow of fluid in the case of lost inlet pressure.

Fluid flow controlling valves may be used in many different fluid handling systems in which the valves, during operation of the systems, remain open. In many of these types of systems it is imperative to provide a one-way fluid flow non-return valve in order to prevent reverse flow of fluid in the event of pressure lost.

Further, in most fluid handling systems non-return flow valves are installed at the inlet for the system and are not readily adaptable for use at various discharge points of the fluid handling system.

SUMMARY OF THE INVENTION

In a first disclosed form of the instant invention a blind bore is provided in the valve stem and a piston, provided with a shank, has its shank slidably received within the blind bore with a compression spring seated within the blind bore in front of the piston shank. As the valve is opened the pressure of the supply fluid acting upon the piston maintains the latter in a retracted position to thereby allow fluid flow through the valve. However, if the supply pressure is terminated, the compression spring biases the piston to a closed position.

In a second disclosed form of the instant invention additional structures are incorporated in order to reduce any tendency of malfunction of the valve as a result of the buildup of impurities or small dirt particles therein.

The main object of this invention is to provide a one-way fluid flow, non-return flow valve which may be used in substantially any environment, and which is specifically adapted for use at each domestic plumbing water flow controlling valve station.

Another object of this invention is to provide a non-return flow valve which will be wholly operative to prevent the return flow of fluid therethrough, even if the pressure of supply fluid to the valve is reduced to zero.

Yet another important object of this invention is to provide a non-return flow valve in accordance with the preceding objects which may be readily substituted for existing flow controlling valve assemblies of pre-existing domestic water controlling valve fixtures.

A final object of this invention to be specifically enumerated herein is to provide a non-return flow valve construction in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
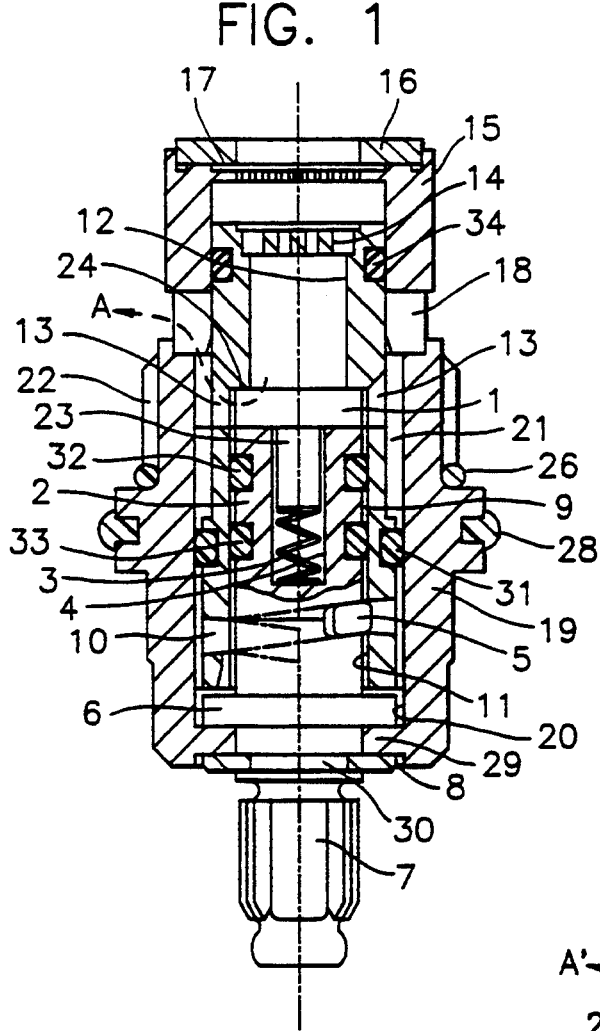
FIG. 1 is a longitudinal sectional view of a first form of non-return flow valve constructed in accordance with the present invention.

Referring now more specifically to FIG. 1, a valve body is designated at 19 and threaded at 21 for threaded engagement with and mounting within the body of a domestic water supply valve housing. The body 19 includes suitable seal rings 26 and 28 for forming desired seals with the associated valve housing.

The body 19 defines an inner chamber 20 in which a shaft 2 is loosely received and one end of the shaft 2 includes a blind bore 4 formed therein in which a compression spring 3 is seated, the shank or stem 23 of a piston 1 being loosely telescoped within the outer end of the blind bore 4 outwardly of the spring 3. The piston 1 overlies and abuts the end of the shaft 2 through which the blind bore opens and the shaft 2 includes a diametrically enlarged shoulder or flange 6 disposed immediately inward of the centrally apertured end wall 29 of the body 19 through which the shaft 2 projects. In addition, a clip-type retainer washer 8 is releasably engaged in a circumferential groove 30 formed in the shaft 2 immediately outward of the end wall 29 and thus retains the shaft 2 against axial shifting relative to the body 19, the end of shaft 2 remote from the blind bore 4 being splined as at 7 for receiving a handwheel thereon.

The interior of the body 19 inward of the end wall 29 defines the chamber 20 and the end of the chamber 20 remote from the end wall 29 is partially closed by a tubular cover 15 provided with diametrically opposite mutually rectangular grooves 18 establishing water outlet openings from the cover 15, the grooves 18 being formed in the tubular cover 15 at the juncture thereof with end of the tubular body 19 remote from the end wall 29.

A sleeve or bushing 9 is disposed within the chamber 31 about the shaft 2 and includes a helical groove 10 formed therein. The shaft 2 includes a radially outstanding wedge 5 slidingly received within the groove 10 and the bushing 9 is loosely received in the chamber 20 and includes a O-ring 31 sealing the exterior of the bushing 9 to the chamber 20 while the shaft 2 includes a pair of O-rings 32 and 33 sealing the exterior of the shaft 2 to the interior of the bushing 9.

The end of the bushing 9 adjacent the flange 6 is somewhat larger in diameter than the end of the bushing 9 adjacent the cover 15, whereupon an annular space 21 is defined about the end of the bushing 9 remote from the flange 6 within the body 19.

The end of the bushing 9 in which the shaft 2 is rotatably received has a large inside diameter as at 11 and the end of the bushing 9 remote from the flange 6 has a small inside diameter as at 12, the bushing 9 defining an annular seating surface at 24 between the large and small inside diameter portions of the bushing 9.

The small inside diameter end portion of the bushing 9 is slidably received within the cover 15 and includes an O-ring 34 forming a fluid tight seal between the interior of the cover 15 and the bushing 9.

The open end of the bushing 9 remote from flange 6 is provided with a relatively coarse screen and the open upper end of the cover 15 is provided with a finer integral screen 17, the upper terminal end of the cover 15 including an annular gasket supported therefrom for fluid tight seal engagement with an opposing seat of a valve casing (not shown) in which the body 19 is threadedly engaged.

The sleeve or bushing 9, downstream from the seating surface 24, includes diametrically opposed tangential grooves 13 by which water may pass from the interior of the sleeve or bushing 9 into the annular space 21 and thereafter from the annular space 21 through the rectangular grooves 18 to the exterior of the body 19 along path A when the piston 1 is moved away from the seating surface 24.

Assuming that the body 19 is threaded into an attendant valve casing, by turning the shaft 2 through the utilization of a handwheel secured over the splined portion 7, the sleeve may be axially shifted upwardly as viewed in FIG. 1 from the closed position of the valve. This of course moves the seating surface 24 upwardly away from the upper end of the shaft 2 in which the blind bore 4 is formed and, with the pressure of the attendant water supply pushing downward on the piston 1, the seating surface 24 moves upwardly away from the piston i to thereby allow water flow downwardly through the upper small diameter interior portion 12 of the bushing 9, through the tangential grooves 13, into the annular space 21 and thereafter outwardly of the grooves 13 along path A. However, should the pressure of the water supply entering the upper end of the bushing 9 be substantially reduced or terminated, the spring 3 upwardly biases the piston 1 back into contact the seating surface 24 and thereby terminates the flow of fluid through the body 19 in either direction.

Of course of the strength of the spring 3 may be varied in order to prevent reverse flow of fluid through the body 19 whenever the inlet pressure of fluid drops below a selected predetermined value.

Figure 2:
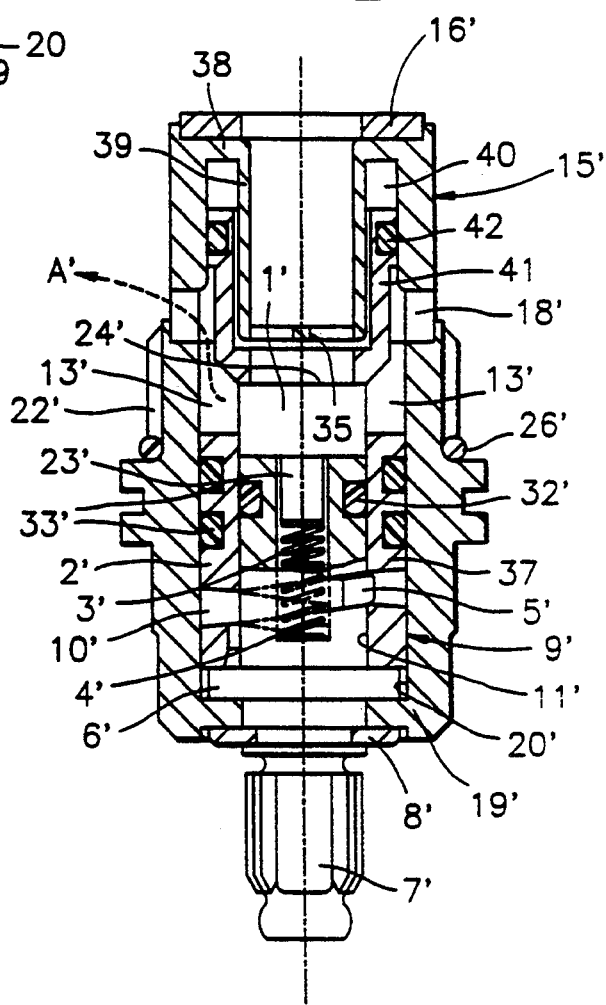
FIG. 2 is a longitudinal sectional view of a second modified form of non-return flow valve constructed in accordance with the present invention.

With attention now invited more specifically to FIG. 2, a second form of invention is illustrated including various parts thereof which correspond directly to similar parts of the first form of the invention illustrated in FIG. 1 and which are indicated by corresponding prime reference numerals.

The structure of FIG. 2 differs from the structure of FIG. 1 in that the shaft 2' includes a single O-ring 32' sealing the shaft 2' relative to the bushing 9' and the bushing 9' includes a pair of O-rings 33' sealing the bushing 9' to the chamber 20', the upper end of the shaft 2' being radiused as at 2". In addition, the cover 15' includes an inwardly projecting upper annular end wall 38 downwardly from whose inner periphery an internal sleeve 39 extends defining an annular space 40 within the cover the 15'. In addition, the upper end of the bushing 9 includes a smaller diameter upper portion 41 which is upwardly slidingly received within the annular space 40 and includes an O-ring 42 establishing a fluid tight seal between the exterior of the upper portion 41 and the outer surface of the annular space 40.

The operation of the invention as illustrated in FIG. 2 is generally the same as the operation of that form of the invention illustrated in FIG. 1, rotation of the shaft 2' causing upward displacement of the bushing 9' and thereby enabling inlet pressure of fluid within the inner sleeve 39 maintain the piston 1' seated upon the upper end of the shaft 2 and water to therefore pass downwardly through the internal sleeve 39, the smaller part 41 of the bushing 9' and thereafter outwardly through the grooves 13' and the grooves 18' along path A'.

On the other hand, should the inlet pressure of fluid to the internal sleeve 39 be terminated, the piston 1' will be biased upwardly by the spring 3' to seat the piston 1' against the seating surface 24', to thus terminate flow of fluid through the valve in either direction.

The internal sleeve 39 includes crossed bars 35 forming a screen.

The internal sleeve 39 of cover 15' functions to reduce pressure within the annular space 40 to thereby reduce to a great extent the possibility of eventual sticking of the small diameter upper portion 41 of the bushing 9' during axial and rotational displacement when the wedge 5' contacts the end of the spiral groove 10'.

Thus, the second modified form of the invention illustrated in FIG. 2 is less likely to malfunction in the event of impurities contained within the liquid flowing therethrough.

What is claimed as new is as follows:

1. One-way fluid flow non-return valve, consisting of body with shaft onto which a cover with gasket is placed around screen, executed on front part of cover, wherein into the blind hole on shaft a helical spring is placed, together with a sliding-fit shaft of piston whereby shaft with piston is introduced into the central opening of bushing, made on its lower part with a helical groove, into which wedge of shaft engages, and bushing at the transition place of larger internal diameter of opening to the smaller internal diameter is executed with two diametrically opposed grooves.

2. Non-return valve according to claim 1, wherein onto the valve body a cover with mutually rectangular cut-out grooves is placed.

3. Improved one-way fluid flow non-return valve, containing a two-diameter cylindrical bushing, realized on one side in form of a larger cylindrical part and internal opening, and on the other side in form of a smaller cylindrical part and internal opening, and on the place of transition of the smaller and larger cylindrical parts, two diametrically opposed tangential grooves are made, while into the internal opening of bushing shaft with piston is introduced by its shaft into the blind hole of shaft, according to the basic application wherein into the internal opening of the smaller cylindrical part of bushing with an O-ring the internal envelope of cover is introduced, whereby the external and internal envelopes of cover mutually connected by the bottom of cover.

4. Improved non-return valve according to claim 1 wherein as a whole with the internal envelope end of cover, two rectangularly crossed ribs were molded.

5. An one-way fluid flow valve including a tubular body having a closed end and an open inlet end, a control shaft having one end journaled through said closed end and a second end terminating within said body a spaced distance from said open end, a control sleeve slidable in said body and journaled on said control shaft inward of said closed end and including a reduced internal diameter portion spaced beyond said second end toward said open end and defining an annular seat at said reduced internal diameter portion, a piston slidably mounted in said sleeve between said second end and said seat and seatable against the latter, biasing means operably connected between said piston and shaft yielding biasing said piston toward said seat, said sleeve defining at least one lateral opening therein adjacent said seat and between the latter and said shaft when said valve is closed, said sleeve and shaft including coacting motion converting means operative to shift said sleeve back and forth within said body responsive to oscillation of said shaft relative to said tubular body, said tubular body including at least one lateral opening therein in constant communication with the first mentioned lateral opening.

6. The valve of claim 5 wherein said second end of said control shaft includes a centered blind bore, said piston including a reduced diameter shank slidably and rotatably telescoped into the outer end portion of said blind bore.

7. The valve of claim 6 wherein said biasing means includes a compression spring seated in said blind bore and applying a yieldingly outward force on said shank.

8. The valve of claim 5 wherein the end of said control sleeve adjacent said open inlet end includes screen means extending thereacross.

9. The valve of claim 5 wherein said open inlet end of said body includes an internal sleeve projecting inwardly therefrom and defining an annular space between said body and internal sleeve closed at said inlet end of said body, said control sleeve including an end portion remote from said closed end of said body slidingly telescoped and sealed within said annular space.

10. The valve of claim 9 wherein said end of internal sleeve remote from said inlet end of said body includes screen means extending thereacross.

11. The valve of claim 5 wherein said motion converting means includes a helical slot in said control sleeve and a radially outwardly projecting wedge lug on said control shaft slidable in said slot.

12. The valve of claim 5 wherein said inlet and said body includes annular seal means for sealed engagement with a valve housing inlet and the exterior of said body is threaded for engagement within a threaded access port provided on said valve housing.

* * * * *